US012237138B2

(12) United States Patent
Magera et al.

(10) Patent No.: US 12,237,138 B2
(45) Date of Patent: Feb. 25, 2025

(54) MONOLITHIC HEATER FOR THERMIONIC ELECTRON CATHODE

(71) Applicant: Applied Physics Technologies, Inc., McMinnville, OR (US)

(72) Inventors: Gerald G. Magera, Hillsboro, OR (US); Aaron M. Torok, Milwaukie, OR (US); Joel A. Wenrich, Newberg, OR (US); Matthew C. Zappe, Mechanicsburg, PA (US)

(73) Assignee: Applied Physics Technologies, Inc., McMinnville, OR (US)

( * ) Notice: Subject to any disclaimer, the term of this patent is extended or adjusted under 35 U.S.C. 154(b) by 0 days.

(21) Appl. No.: 18/596,561

(22) Filed: Mar. 5, 2024

(65) Prior Publication Data

US 2024/0212964 A1 Jun. 27, 2024

Related U.S. Application Data

(63) Continuation of application No. 18/261,645, filed as application No. PCT/US2023/060528 on Jan. 12, 2023, now Pat. No. 11,948,769.

(Continued)

(51) Int. Cl.

| | |
|---|---|
| ***H01J 1/16*** | (2006.01) |
| ***H01J 9/04*** | (2006.01) |
| ***H05B 3/14*** | (2006.01) |

(52) U.S. Cl.

CPC ................ *H01J 1/16* (2013.01); *H01J 9/042* (2013.01); *H05B 3/145* (2013.01)

(58) Field of Classification Search

CPC ...... H01J 1/16; H01J 1/304; H01J 1/15; H01J 1/148; H01J 1/22; H01J 1/20; H01J 1/14; H01J 9/042; H01J 9/025; H01J 9/04; H01J 9/08; H01J 37/06; H01J 37/073; H01J 37/065; H01J 2201/30469; H01J 2201/19;

(Continued)

(56) References Cited

U.S. PATENT DOCUMENTS 3,998,678 A * 12/1976 Fukase .................... H01J 9/025 427/259

5,735,720 A * 4/1998 Gartner ..................... H01J 1/16 445/24

(Continued)

FOREIGN PATENT DOCUMENTS

WO 2023088565 A1 5/2023

*Primary Examiner* — Shawntina T Fuqua

(74) *Attorney, Agent, or Firm* — Foster Garvey P.C.

(57) ABSTRACT

A monolithic graphite heater for heating a thermionic electron cathode includes first and second electrically conductive arms, each one of the first and second electrically conductive arms having an electrode mount at a proximal end, a thermal apex at a distal end, and a transitional region between the electrode mount and the thermal apex; a cathode mount electrically and mechanically coupling each thermal apex to form a maximum Joule-heating region at or adjacent the cathode mount and decreasing Joule-heating along each transitional region; and a press-fit aperture formed in the cathode mount, the press-fit aperture sized to receive at least a portion of the thermionic electron cathode for facilitating thermionic emission produced therefrom in response to operative heat power generation provided by the maximum Joule-heating region.

11 Claims, 14 Drawing Sheets

Related U.S. Application Data

(60) Provisional application No. 63/266,717, filed on Jan. 12, 2022.

(58) Field of Classification Search
CPC ....... H01J 2201/2803; H01J 2201/2889; H01J 2209/0223; H01J 2237/06341; H01J 2237/06308; H01J 3/02; H05B 3/145
See application file for complete search history.

(56) References Cited

U.S. PATENT DOCUMENTS

| | | | | |
|---|---|---|---|---|
| 7,544,523 | B2 | 6/2009 | Schwind et al. | |
| 8,547,005 | B1 | 10/2013 | Smith et al. | |
| 2003/0085645 | A1 | 5/2003 | Terui et al. | |
| 2014/0065918 | A1 | 3/2014 | Magera et al. | |
| 2015/0054398 | A1 | 2/2015 | Yan | |
| 2017/0263435 | A1* | 9/2017 | Geist | H01K 1/14 |
| 2023/0197396 | A1* | 6/2023 | Kruse | H01J 35/066<br>378/136 |

* cited by examiner

MONOLITHIC HEATER FOR THERMIONIC ELECTRON CATHODE

RELATED APPLICATION

This application claims priority benefit to U.S. Provisional Patent Application No. 63/266,717, filed Jan. 12, 2022, which is hereby incorporated by reference in its entirety.

TECHNICAL FIELD

This application relates generally to thermionic emitters. In particular, this application relates to heaters formed of a common material that is shaped to localize heat at a thermionic electron cathode.

BACKGROUND INFORMATION

Applied Physics Technologies, Inc. (APTech) of McMinnville, Oregon specializes in development of thermionic and field emission cathodes. For example, APTech provides CeBix® cathodes (cerium hexaboride), $LaB_6$ cathodes (lanthanum hexaboride), HfC cathodes (hafnium carbide), CFE, and ESE sources. Its cathodes have been used in many different applications, such as microscopy, microanalysis, additive manufacturing, and other industries employing electron sources in their products and workflows.

Thermionic cathode sources are heated to a temperature that causes the high energy tail of the Fermi-Dirac density of states to exceed the work function of the material. Therefore, a good thermionic emitter would have a low work function, good material stability at high temperatures, as well as good vacuum compatibility. Thermionic electron sources have an operating temperature of about 1,800 degrees Kelvin or more, and they are typically operated in high (about 1E-6 mbar) to ultra-high vacuum (about 1E-9 mbar).

The heater structure that brings the thermionic cathode source to operating temperature is typically formed from refractory metals such as Tungsten, Rhenium, Tantalum, Molybdenum or some combination of them. All physical quantities have some temperature dependence, so creep, thermal expansion, evaporation, drift, and other physical quantities are all relevant in the design of a heater structure.

One type of conventional heater for a thermionic cathode source is called a mini-Vogel mount (MVM), which are available from APTech. MVMs are used as heaters in thermionic emitters employing the thermionic electron cathodes mentioned above. FIG. 5 of U.S. Pat. No. 7,544,523 shows a typical MVM in which twin posts are rigidly fixed in a thick ceramic base and bent towards the center in an inverted V shape. The posts are typically made of a molybdenum-rhenium alloy or other material that maintains a high modulus of elasticity even at high temperatures. During assembly, the posts are spread slightly to receive the thermionic electron cathode and pyrolytic graphite blocks. When the posts are then released, the thermionic electron cathode and the pyrolytic graphite blocks are held in place by the clamping force of the posts. Nevertheless, a common failure mode for MVMs is stress fractures placed on the thermionic cathode source during operation or relaxation of the MoRe posts.

Other examples of heathers include filaments machined to standard geometry and traditional wire or ribbon filaments. Long, thin filament that are refractory metal wire or ribbon have temperature and mechanical stability issues. For example, a filament (wire) can undergo physical changes and move over time due to recrystallization, spot-weld variance, and thermally induced stress relaxation.

SUMMARY OF THE DISCLOSURE

Disclosed is a monolithic heater having its geometry and structure designed such that its hottest part, acting as a filament, is at an optimal location for a thermionic cathode source. A selectable limited area of the structure is made hot by tuning the geometry of the filament. The filament is constructed of single piece of material. A monolithic device can more mechanically stable since, with regard to the mechanical stress, graphite has a lower coefficient of thermal expansion compared to metals at 2,000 degrees Kelvin. It is believed that the improved mechanical stability produces an electron beam that moves less. The disclosed embodiments have the ability to reduce the risk of filament burn out, improve heater stability and operating lifetime, reduce radiative losses, allow higher operating temperature for a given (standard) power supply, and heat large objects.

In one aspect, a monolithic graphite heater for heating a thermionic electron cathode includes first and second electrically conductive arms. Each one of the first and second electrically conductive arms has an electrode mount at a proximal end, a thermal apex at a distal end, and a transitional region between the electrode mount and the thermal apex. The monolithic graphite heater also includes a cathode mount electrically and mechanically coupling each thermal apex to form a maximum Joule-heating region at or adjacent the cathode mount and decreasing along each transitional region. And the monolithic graphite heater has a press-fit aperture formed in the cathode mount. The press-fit aperture is sized to receive at least a portion of the thermionic electron cathode for facilitating thermionic emission produced therefrom in response to operative heat power generation provided by the maximum Joule-heating region.

Additional aspects and advantages will be apparent from the following detailed description of embodiments, which proceeds with reference to the accompanying drawings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION OF EMBODIMENTS

Figure 1:
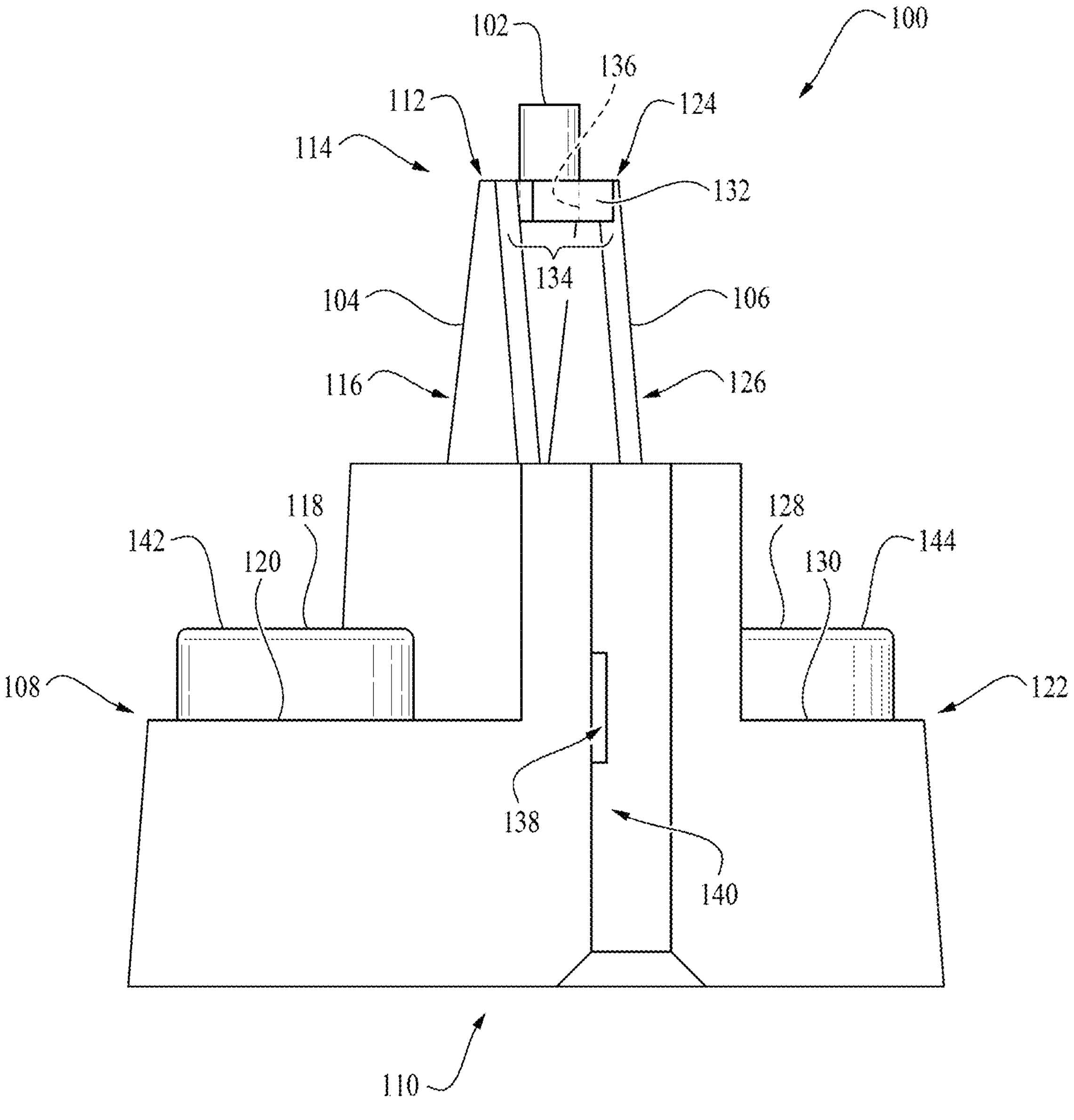
FIG. 1 is a pictorial view of a monolithic graphite heater for heating a cylindrical thermionic electron cathode mounted in a cathode mount of the heater, according to one embodiment.

FIG. 1 shows a monolithic graphite heater 100 for heating a thermionic electron cathode 102. Monolithic graphite heater 100 includes a first electrically conductive arm 104 and a second electrically conductive arm 106.

First electrically conductive arm 104 includes a first electrode mount 108 at a proximal end 110, a first thermal apex 112 at a distal end 114, and a first transitional region 116 between first electrode mount 108 and first thermal apex 112. A first electrode 118 is disposed in a first aperture 120 of first electrode mount 108. A grommet 142 is the circular ring pressed onto first electrode 118.

Similarly, second electrically conductive arm 106 includes a second electrode mount 122 at proximal end 110, a second thermal apex 124 at distal end 114, and second transitional region 126 between second electrode mount 122 and second thermal apex 124. A second electrode 128 is disposed in a second aperture 130 of second electrode mount 122. A grommet 144 is the circular ring pressed onto second electrode 128.

A cathode mount 132 spans between first thermal apex 112 and second thermal apex 124 to electrically and mechanically couple each apex to form a maximum Joule-heating region 134 adjacent cathode mount 132 and decreasing along each of first transitional region 116 and second transitional region 126. According, maximum Joule-heating region 134 is the region where resistance is the highest for a constant current.

A press-fit aperture 136 is formed in cathode mount 132. Press-fit aperture 136 is sized to receive at least a portion of thermionic electron cathode 102 (e.g., a bottom cylindrical section) for facilitating thermionic emission produced therefrom in response to operative heat power generation provided by maximum Joule-heating region 134.

Monolithic graphite heater 100 acts like a filament in that current runs up one side and down the other side. Additional details of the heating are shown and described later with reference to FIG. 4-FIG. 7.

Thermionic electron cathode 102 is press-fit into press-fit aperture 136 of monolithic graphite heater 100 so there is no need for welding. This enables a large design space for the shape of thermionic electron cathode 102, and hence emission characteristics. Furthermore, monolithic graphite heater 100 is made from one-piece machined graphite that can receive hard materials like boride or carbine without fracturing them when they are press fit.

In some embodiments, monolithic graphite heater 100 is machined from one piece of material. Monolithic graphite heater 100 is machined with a mechanical breakaway 138 between first electrically conductive arm 104 and second electrically conductive arm 106 so that monolithic graphite heater 100 is stable under machining and mounting of thermionic electron cathode 102. FIG. 1 shows that at least a portion of mechanical breakaway 138 disposed in a gap 140.

Figure 2:
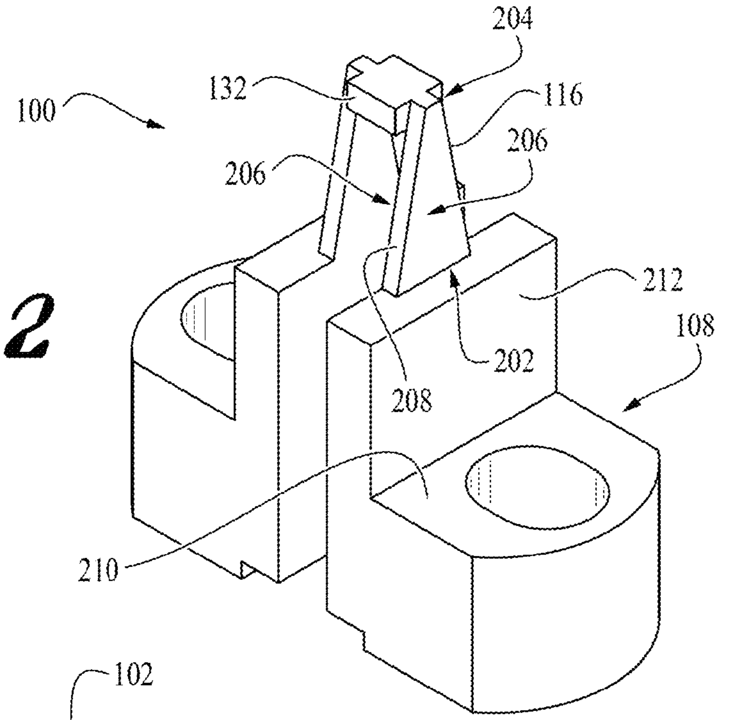
FIG. 2 is an isometric view of the monolithic graphite heater shown in FIG. 1 prior to drilling an aperture in the cathode mount and mating electrodes in each electrode base.
Figure 14:
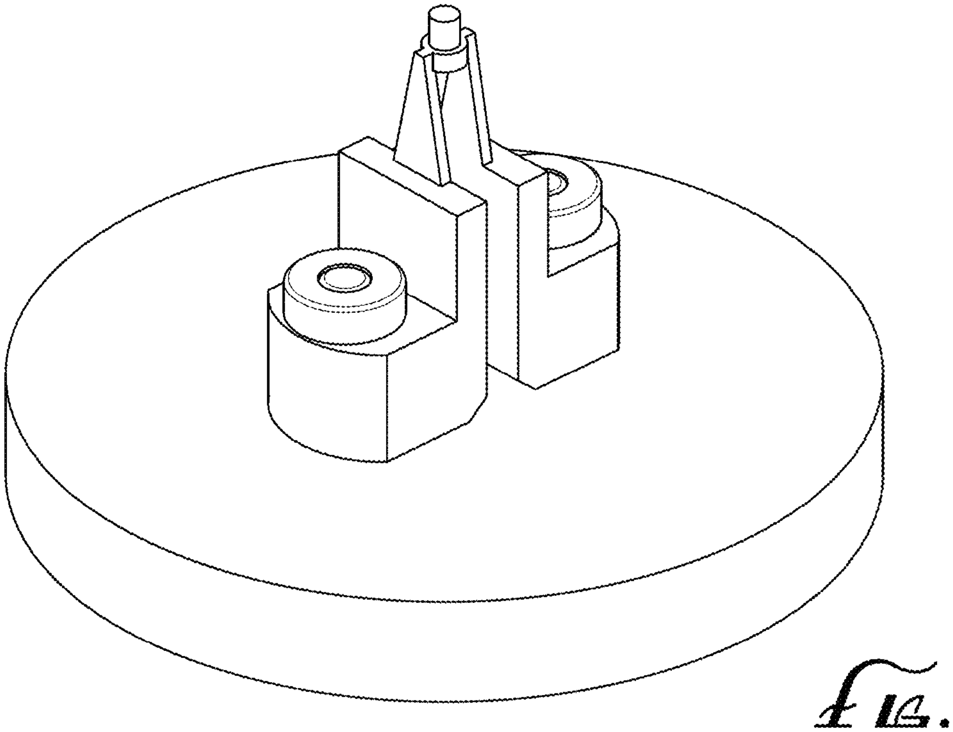
FIG. 14 is a monolithic graphite heater having a cylindrical cathode mount.
Figure 15:
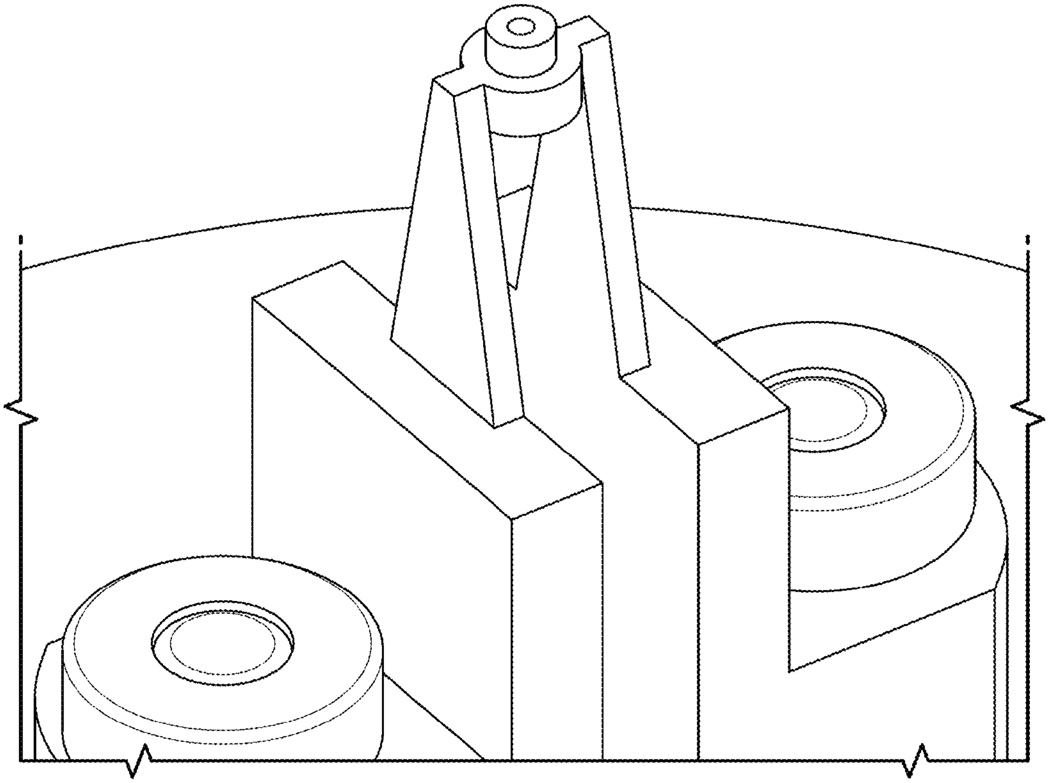
FIG. 15 is a monolithic graphite heater having a stepped-cylindrical cathode mount with an embedded thermionic electron cathode.

FIG. 2 shows monolithic graphite heater 100 before drilling press-fit aperture 136 and before mating first electrode 118 and second electrode 128. In some embodiments, monolithic graphite heater 100 can be precision machined, molded, sintered, formed using electrical discharge machining (EDM), or 3D printed. Moreover, cathode mount 132 can have different shapes (e.g., rectangular, cylindrical, or other shapes for mounting different thermionic cathode sources. Examples of different shapes are shown in FIG. 14 and FIG. 15.

FIG. 2 also shows additional details of each electrode mount and transitional region. In some embodiments, each transitional region includes a rectangular base 202, a rectangular top 204 that is smaller than rectangular base 202, a pair of opposing truncated triangular faces 206, and a uniform thickness 208 between the pair of opposing truncated triangular faces 206.

Each electrode mount has a chair shape, in some embodiments. For example, first electrode mount 108 includes a seat 210 for receiving first electrode 118 (FIG. 1) and a back 212 from which first transitional region 116 extends.

Figure 3:
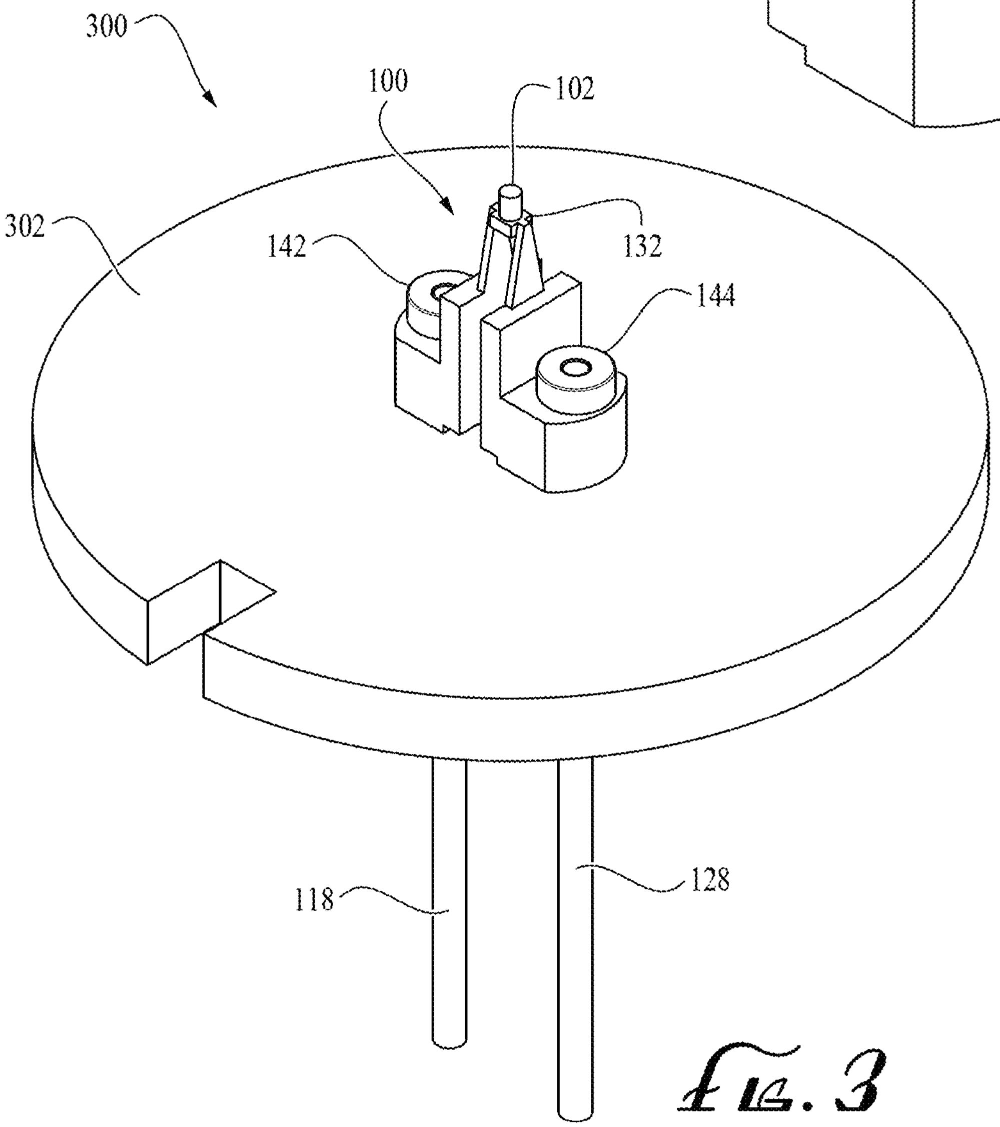
FIG. 3 is an isometric view of a thermionic emitter, showing the monolithic graphite heater of FIG. 1 in an assembled state.

FIG. 3 shows a thermionic emitter 300, which includes machined monolithic graphite heater 100 mounted on a ceramic heater base 302, thermionic electron cathode 102 press fit into cathode mount 132, and first electrode 118 and second electrode 128.

Ceramic heater base 302 is brazed to first electrode 118 and second electrode 128 on one side and the other side confronts proximal end 110. First electrode 118 and second electrode 128 are held in place with grommets 142, 144 so there in no need for welding. This also increases the mechanical stability, as spot-weld integrity is dependent on many parameters, while this mounting scheme is dependent on machining tolerances, which are more controllable. It is more difficult to exactly control the location of a spot-weld to within 0.001 inch than it is to maintain machining tolerances of 0.001 inch.

FIG. 3 shows thermionic emitter 300 in a vertical layout, but skilled persons will appreciate that a horizontal layout or other orientations are also possible. Thermionic emitters 300 may also be retrofit into existing customer sources (i.e., replacing MVMs).

The following one-dimensional, time-independent heat equation for a Joule-heated wire describes physics of a heater structure, which is highly non-linear due temperature dependent coefficients and non-negligible black body radiation at operating temperatures. The equation is analytically intractable, even in the one-dimensional case, for even for the simplest heater shapes, e.g., a filament (heated wire).

$$\frac{d}{dx}\left(\frac{k(T)dT}{dx}\right)+\frac{I^2\rho(T)}{A^2}-\frac{\epsilon(T)\sigma C}{A}\left(T^4-T_0^4\right)=0$$

The thermal conductivity, k(T), resistivity, ρ(T), and emissivity, ϵ(T), are all temperature dependent. Additionally, since k(T) is inside the derivative, it leads to nonlinearity in the second derivative, and there is another nonlinearity due to the $T^4$ term.

Numerical methods are employed to obtain quantitative results for various heater geometries and materials. The use of a multiphysical simulation software (e.g., Elmer FEM, available as open source software) and visualization tools (e.g., Para View software developed by Sandia National Laboratories, Kitware Inc. of Los Alamos, New Mexico) are employed for designing the disclosed heater structures.

Figure 4:
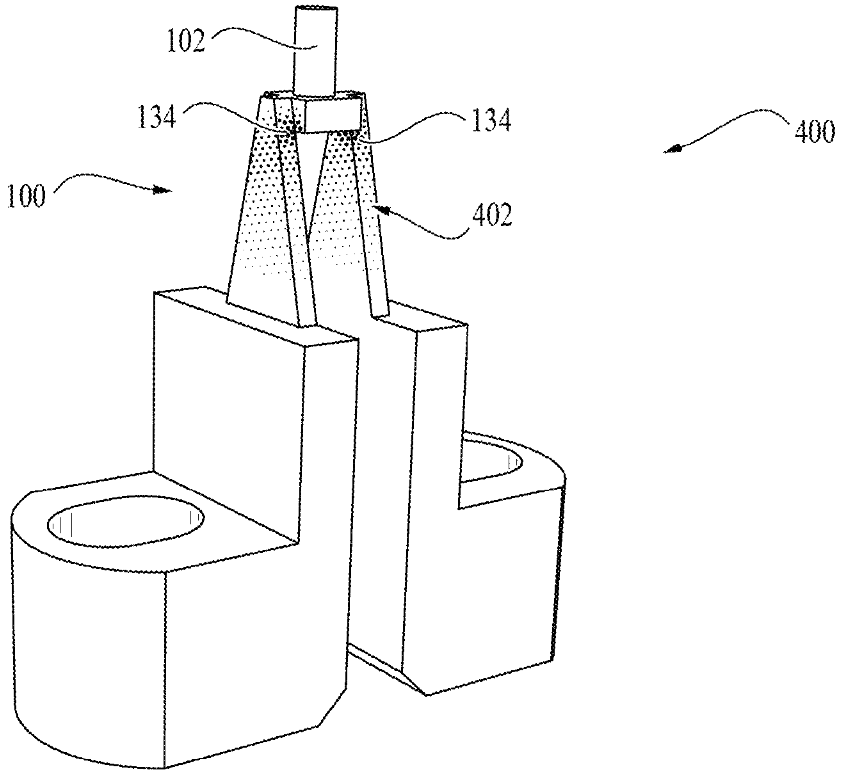
FIG. 4 is a Para View visualization image of a multiphysical software simulation showing a Joule-heating gradient model of the monolithic graphite heater shown in FIG. 1.

FIG. 4 shows results of such numerical methods in the form of a Joule-heating simulation view 400 of monolithic graphite heater 100 that illustrates relative magnitude of Joule-heating in the tapered structure. Due to its tapered shaped, a Joule-heating gradient 402 increases up each transitional region to maximum Joule-heating region 134 that is adjacent cathode mount 132. Joule heating is largest near each apex and decreases in the arms. Tapered arms conduct enough heat to the base that "pinch points" are created near cathode mount 132, keeping the arms sufficiently cool that they do not burn out. In some other embodiments, the maximum Joule-heating region may be at the cathode mount itself.

The Joule-heating power per unit volume is balanced with the radiation loss over the surface area plus the conduction loss through the cross-sectional area such that the temperature of any point on the heating structure will remain as close as possible to the operating temperature of thermionic electron cathode 102. Conduction and radiation are the only ways to lose energy when something is heated in vacuum. By optimizing the geometry using CAD and a multi-physics solver, the structure can be designed to balance conduction losses vs. radiation losses to keep the heater structure at a safe operating temperature, which would extend its useful life. The net power loss can be tailored to this end.

Additionally, the total power input is minimized, as much as is practical, so as to remain within feasible limits for typical power supplies. Minimizing power is desired in some use cases, but not all. Operating at the minimum power input is desirable with regard to power supply limitations, and heat loss in the emitter environment, however, higher power input may be tolerable when mechanical stability and heater lifetime are optimized.

Figure 5:
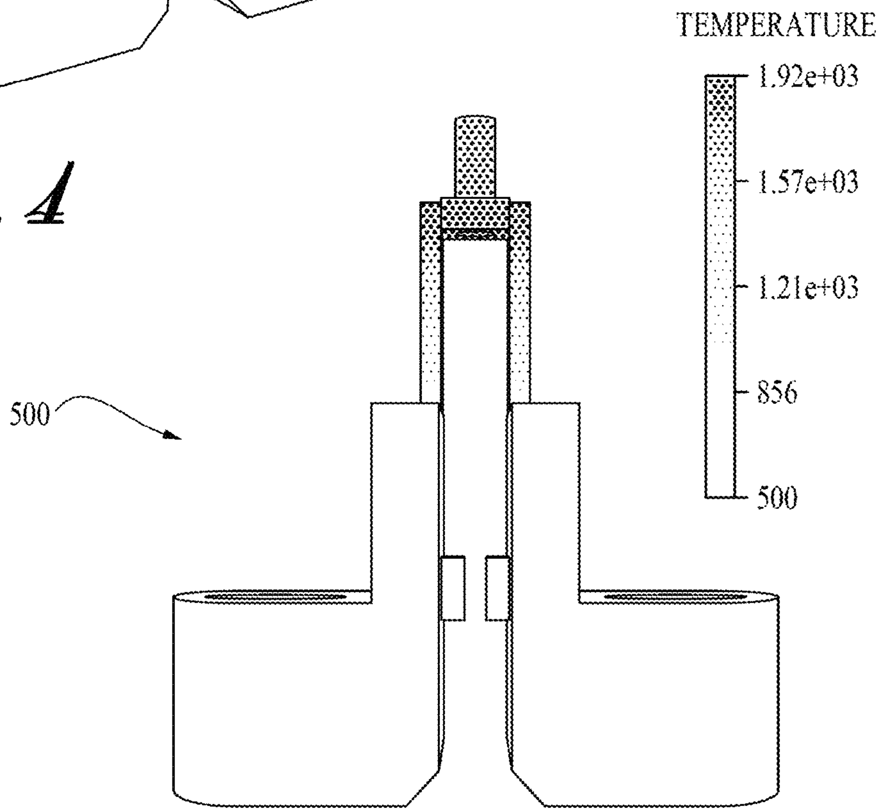
FIG. 5 is another simulation image showing a surface temperature gradient model for a side elevation view of the monolithic graphite heater shown in FIG. 1

FIG. 5 shows an example of thermal modeling of temperature distribution 500 of monolithic graphite heater 100. In this example, thermionic electron cathode 102 is heated to about 1,800 degrees Kelvin. At the operating temperature of 1,800 K, the hottest part is localized at the thermal apex. And because each arm is larger as it extends toward the base, each arm conducts more power away, and lowers power generation in arms. Peak power generation per unit volume is also largest at the thermal apex.

Figure 6:
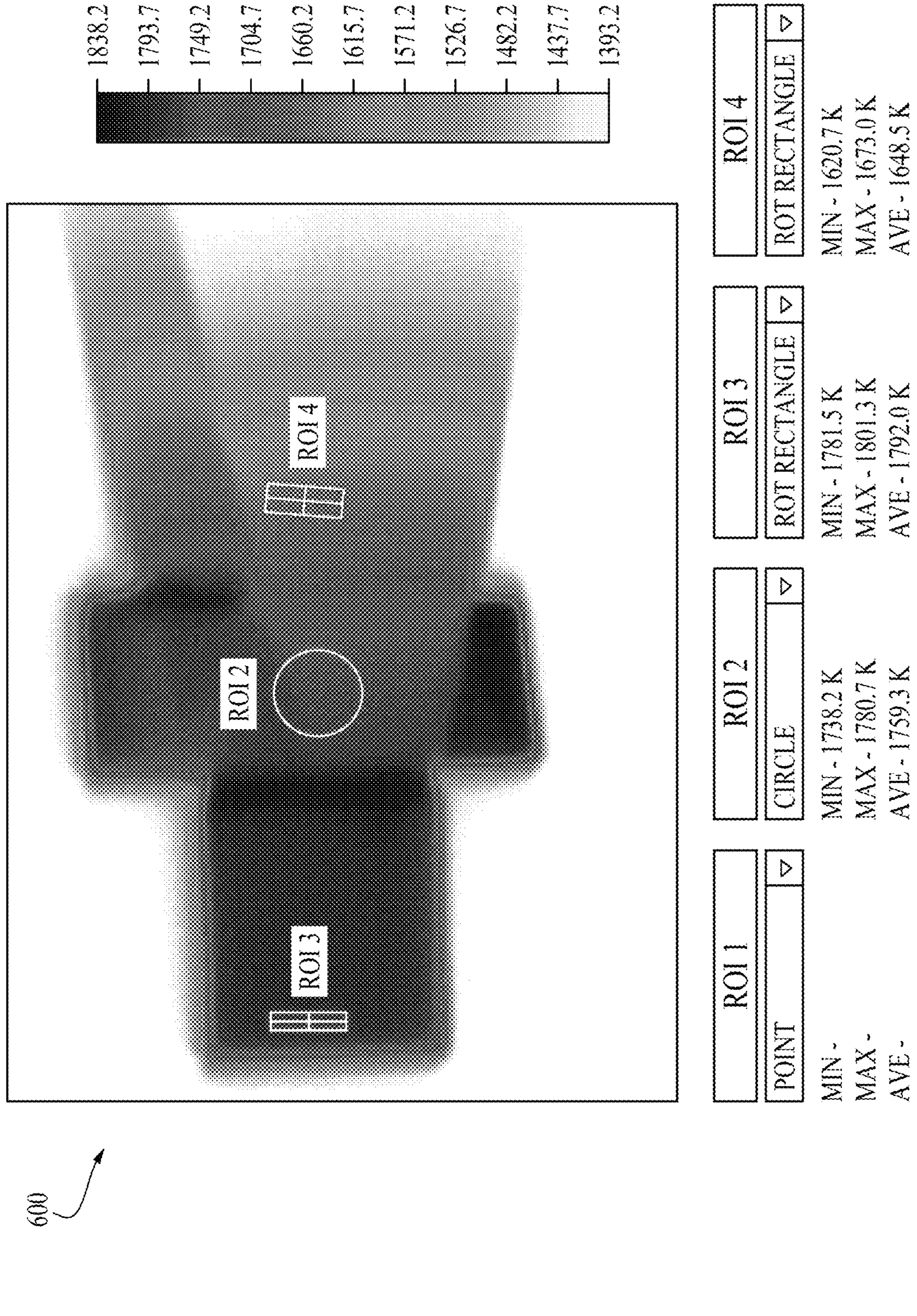
FIG. 6 is an image capture of a thermal imaging software application showing results of thermal testing at a side view of the cathode mount of the monolithic graphite heater shown in FIG. 1.

FIG. 6 shows example test results of thermal imaging 600 of monolithic graphite heater 100 having a 600 μm CeB6 crystal as thermionic electron cathode 102. Data from the test is provided in the table below, in which thermal imaging 600 is centered on Tgright of the table. Cathode mount 132 (Tgleft, Tgright) is the section where the crystal is mounted and is cooler than the end of crystal (Tcrystal). The arms of the structure cool so quickly the temperature is below the device's capability.

| Tcrystal (K) | Tgleft (K) | Tgright (K) | Current (A) | Voltage (V) | Resistance (Ω) | Power (W) |
|---|---|---|---|---|---|---|
| 1600 | 1573 | 1559 | 4.21 | 2.29 | 0.544 | 9.64 |
| 1650 | 1624 | 1611 | 4.35 | 2.3449 | 0.539 | 10.20 |
| 1700 | 1675 | 1662 | 4.49 | 2.4036 | 0.535 | 10.79 |
| 1750 | 1725 | 1714 | 4.63 | 2.4639 | 0.532 | 11.41 |
| 1800 | 1778 | 1768 | 4.78 | 2.5207 | 0.527 | 12.05 |
| 1850 | 1831 | 1823 | 4.94 | 2.5795 | 0.522 | 12.74 |
| 1900 | 1884 | 1879 | 5.11 | 2.6472 | 0.518 | 13.53 |

Figure 7:
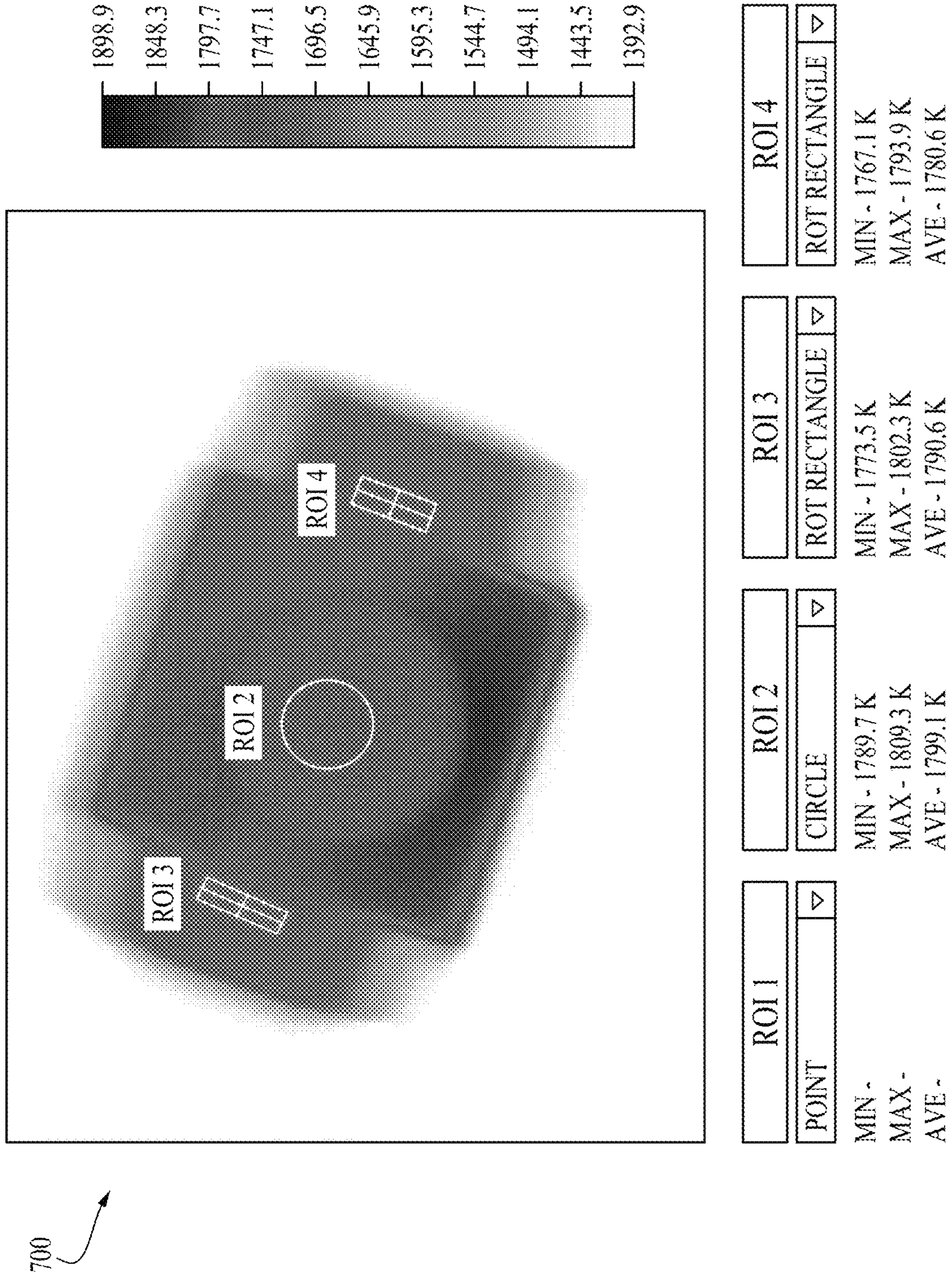
FIG. 7 is an image capture of the thermal imaging software application of FIG. 6 showing results of thermal testing at a top plan view of the cathode mount of the monolithic graphite heater shown in FIG. 1.

FIG. 7 shows additional example test results of thermal imaging 700 of monolithic graphite heater 100 having a 600 μm CeB6 crystal as thermionic electron cathode 102, in which thermal imaging 700 is centered on Tcrystal. In this example, the crystal is set to 1,800 K (with emissivity @0.77). ROI2 temperature in thermal imaging 600 matches ROI4 in thermal imaging 700.

Figure 8:
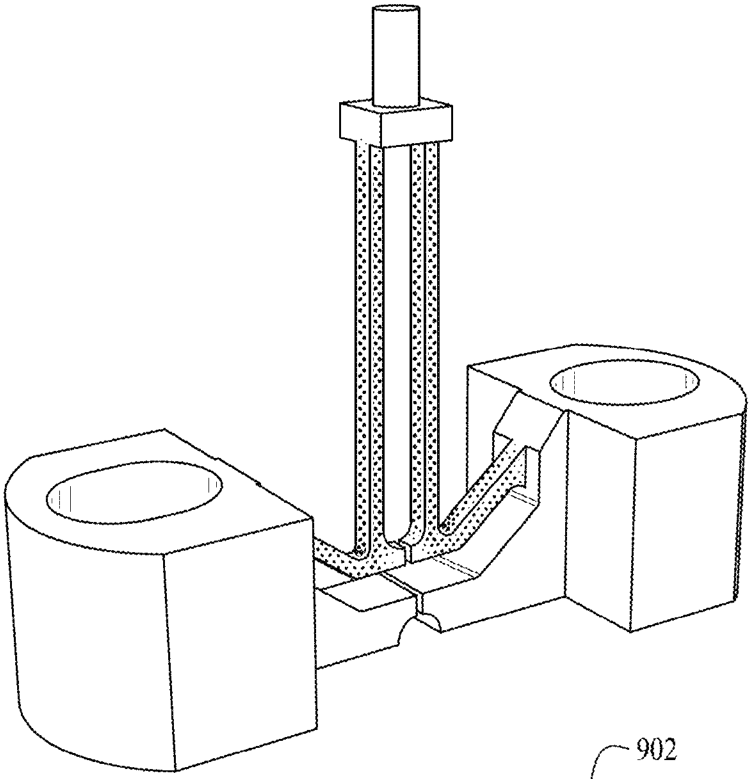
FIG. 8 is another ParaView visualization image showing a Joule-heating gradient model of another monolithic graphite heater.
Figure 9:
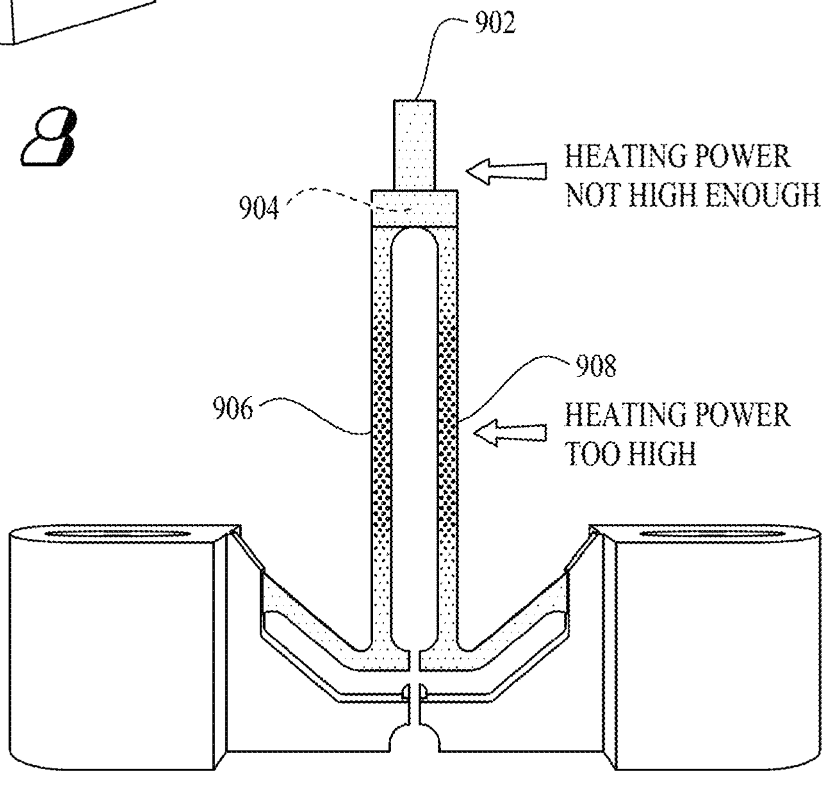
FIG. 9 is another simulation image showing a surface temperature gradient model for a side elevation view of the monolithic graphite heater shown in FIG. 8.

FIG. 8 and FIG. 9 show an example of another design that does not localize heat at a cathode mount. For example, FIG. 8 shows that Joule heating is largest in the arms. Thermal conductivity is not sufficiently high to conduct enough heat to the base, resulting in burnout of the arms at thermionic emitter operating temperature (see FIG. 9). In other words, power generation is too high in the arms compared to the apex.

The table below provides a comparison between the structure of FIG. 8 and FIG. 9 (with long thin arms, typical of wire filament designs) and monolithic graphite heater 100.

| Tcrystal (K) | Tcenter (K) | Tarm1 (K) | Tarm2 (K) | I (A) | U (V) | R (ohm) | Power (W) |
|---|---|---|---|---|---|---|---|
| 1600 | 1593 | 1722 | 1762 | 1.88 | 3.978 | 0.381 | 7.72 |
| 1650 | 1651 | 1819 | 1861 | 2.02 | 4.276 | 0.383 | 9.59 |
| 1700 | 1705 | 1911 | 1935 | 2.16 | 4.579 | 0.389 | 11.78 |
| 1750 | 1757 | 1964 | 2012 | 2.30 | 4.890 | 0.391 | 14.08 |
| 1800 | 1810 | 2073 | 2122 | 2.46 | 5.250 | 0.394 | 16.64 |

-continued

| Tcrystal (K) | Tcenter (K) | Tarm1 (K) | Tarm2 (K) | I (A) | U (V) | R (ohm) | Power (W) |
|---|---|---|---|---|---|---|---|
| 1850 | 1876 | 2174 | 2224 | 2.64 | 5.665 | 0.400 | 19.60 |
| 1900 | 1931 | 2271 | 2320 | 2.82 | 6.087 | 0.404 | 22.75 |

As shown in the table, at 1,800 K, the cathode mount (Tcenter) is slightly hotter than the crystal, and the arms are at least 300 K hotter. At this higher temperature the arms will fail. Also, the overall power is lower on monolithic graphite heater 100 at same temperature.

Figure 10:
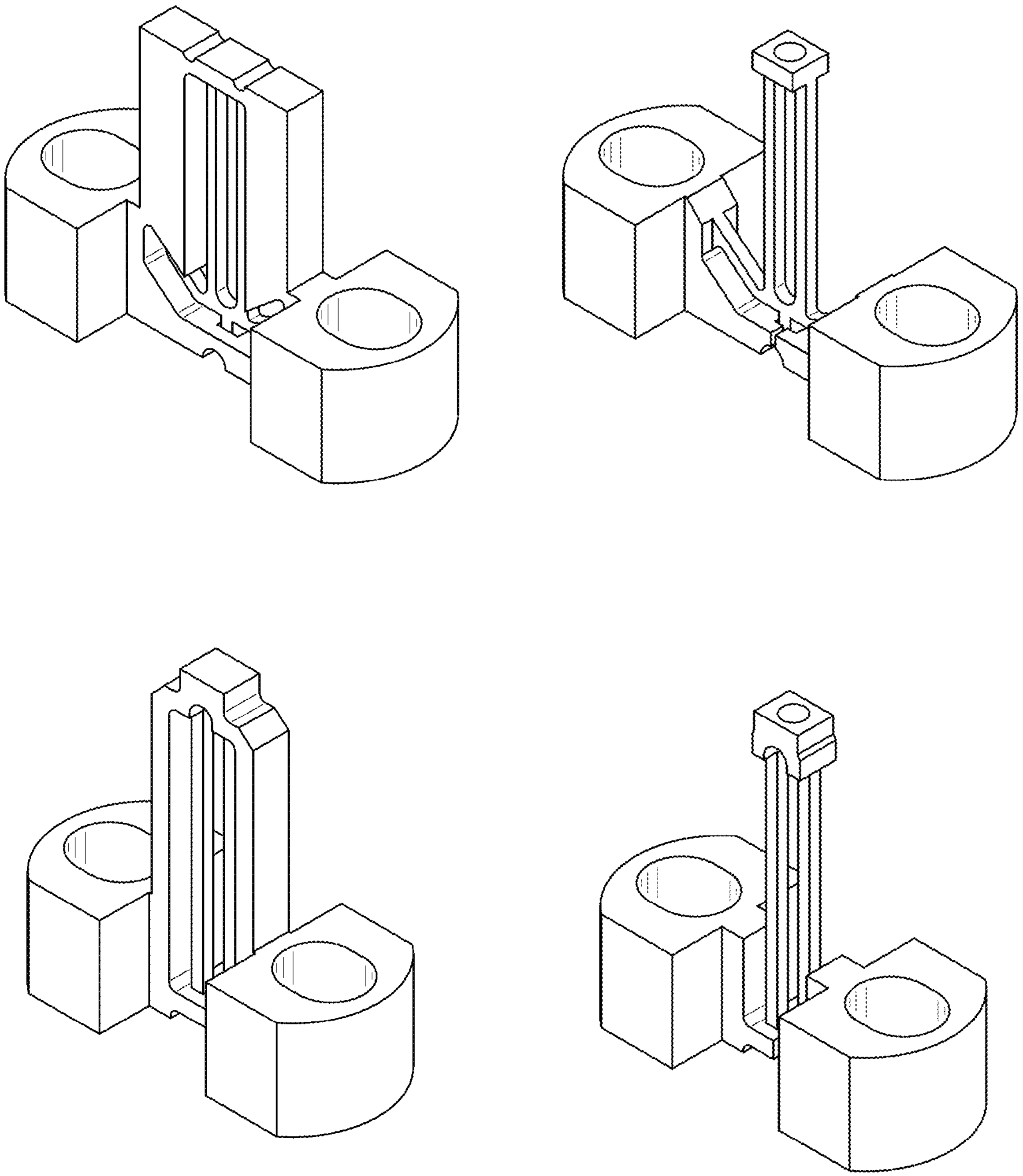
FIG. 10 are isometric views of other variants of monolithic graphite heaters lacking localized heating at a cathode mount.

FIG. 10 shows other failures with respect to undesirable heat-localized zone behavior. Early attempts were made to minimize the cross-sectional area of the arms. This posed two problems in manufacturing such a filament with thin sections that would: (a) feasible yield and survivability during packaging/shipping and (b) structural integrity to withstand drilling of aperture and pressing of crystal. If a filament was made with such thin sections but no cutaway support, either interior or exterior, the arms would snap easily under stress of mounting the cathode.

Figure 11:
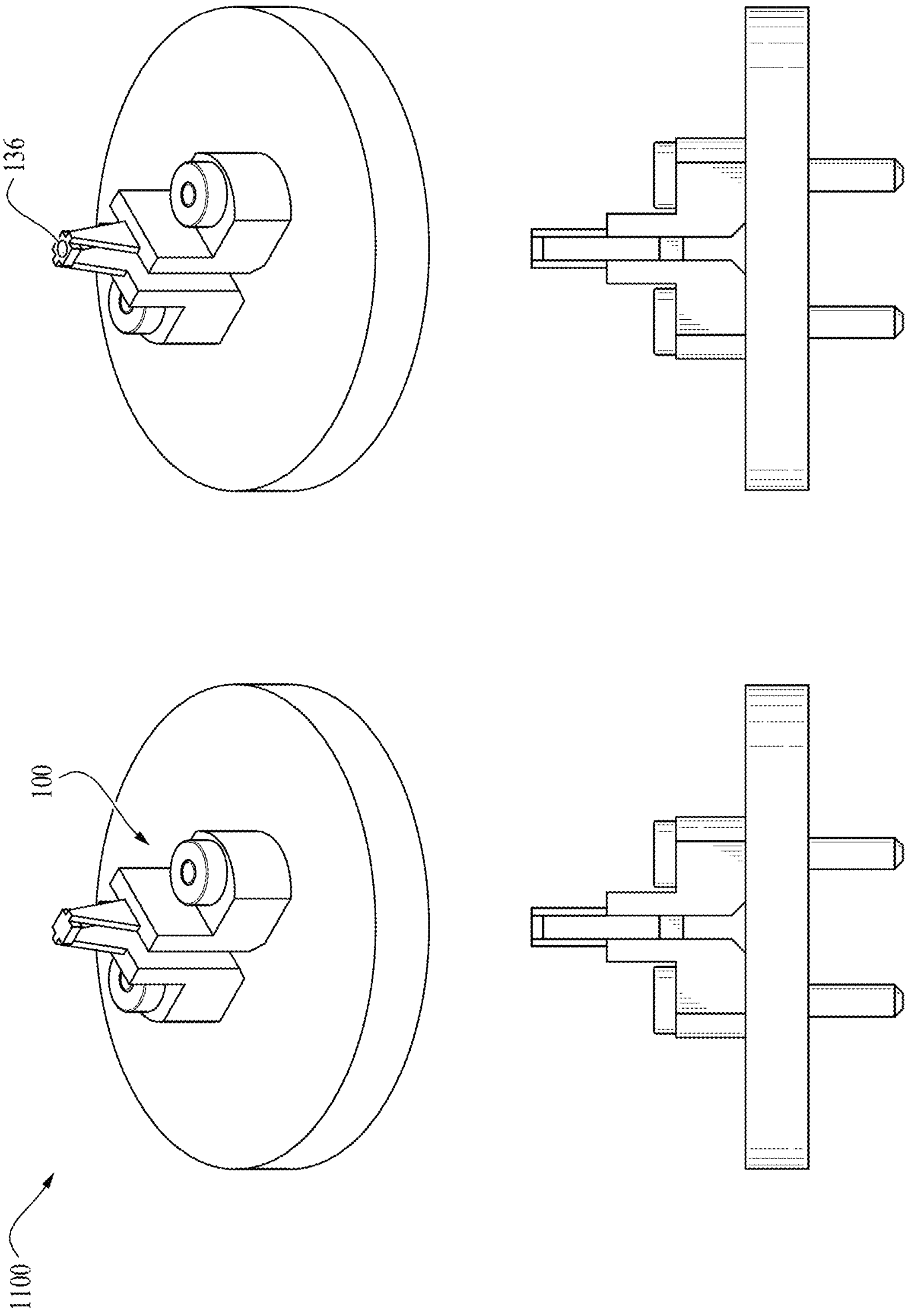
FIG. 11 is a first part of a sequence of isometric views showing mounting of a thermionic cathode source, according to another embodiment.
Figure 12:
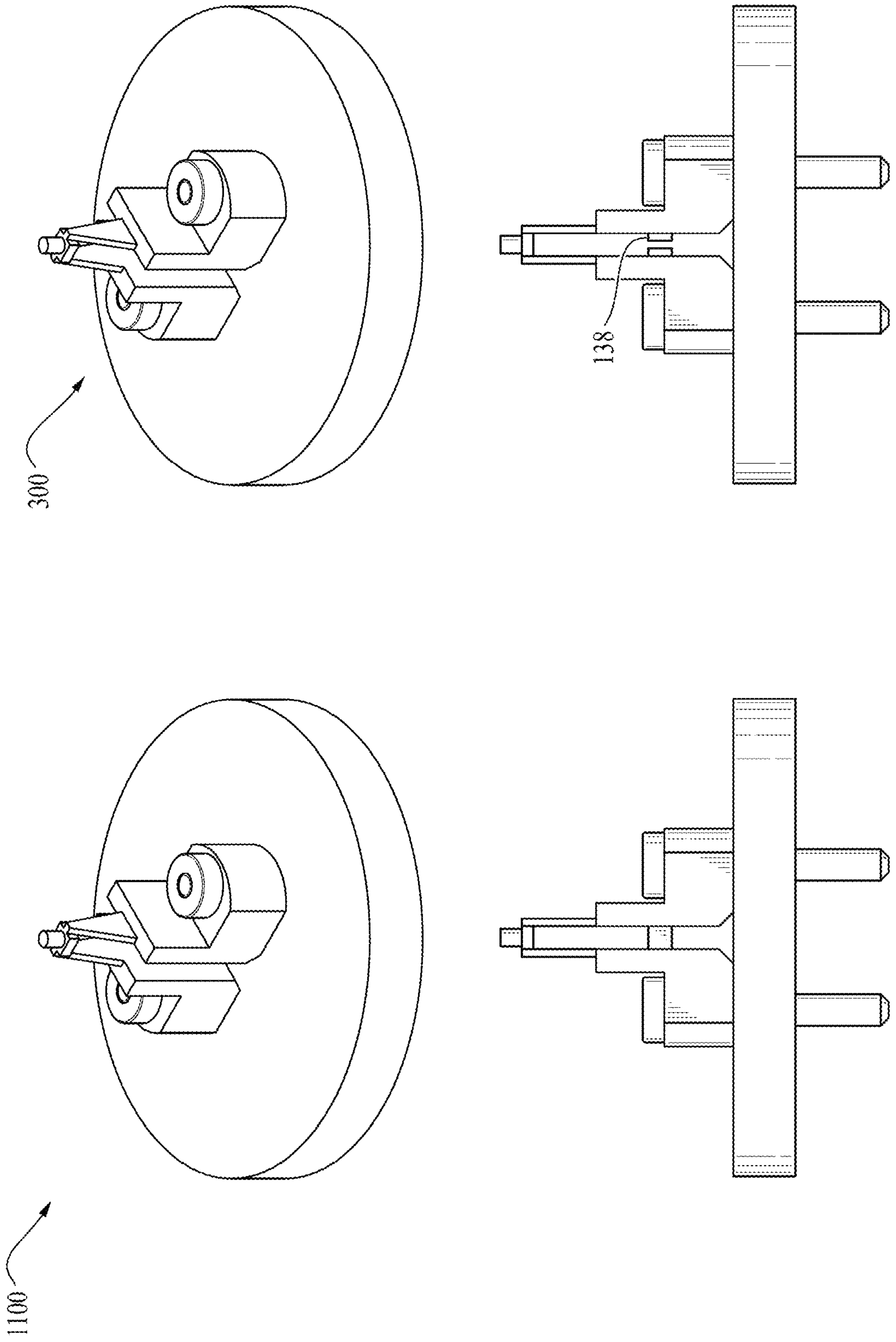
FIG. 12 is a second part of a sequence of isometric views showing mounting of a thermionic cathode source, according to another embodiment.

FIG. 11 and FIG. 12 show the assembly sequence 1100 for thermionic emitter 300, shown during a step-by-step process of aperture-drilling, crystal-pressing in press-fit aperture 136, and structure cutaway. Cutaway is needed to ensure there is one path current can flow between electrodes. Skilled persons will appreciate that the relatively large monolithic structure is more mechanically stable than a multi-piece structure assembled using welding, springs, screws, epoxy, or other materials.

Figure 13:
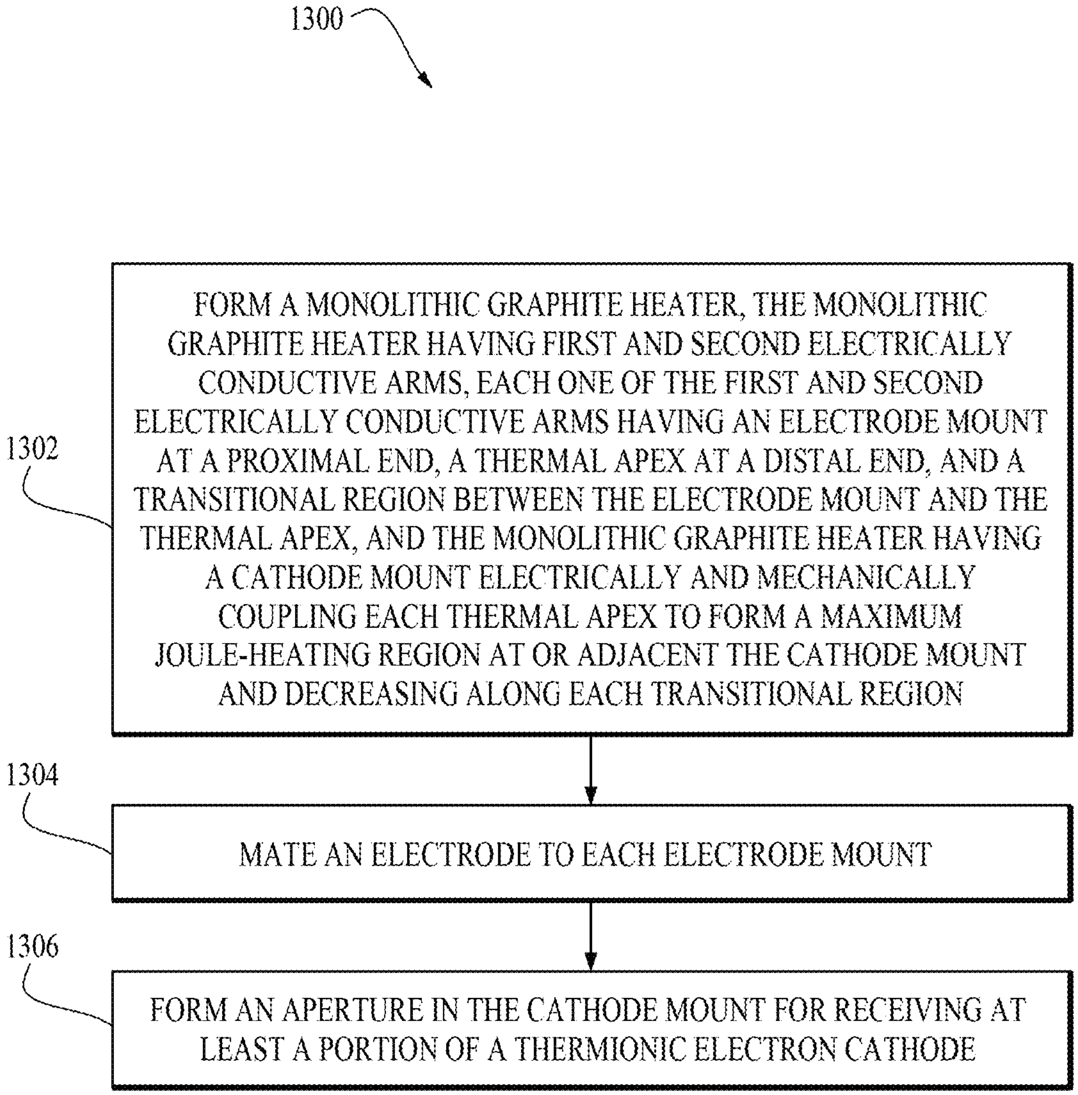
FIG. 13 is flow chart of a method of manufacturing a thermionic emitter in accordance with one embodiment.

FIG. 13 shows a method 1300 of manufacturing a thermionic emitter. In block 1302, method 1300 entails forming monolithic graphite heater 100 (FIG. 1). Forming monolithic graphite heater 100 may entail machining from a solid block, molding material, sintering, forming using EDM, or 3D printing. In block 1304, method 1300 entails mating an electrode to each electrode mount. In block 1306, method 1300 entails removing material (e.g., drilling) the cathode mount to define an aperture in the cathode mount for receiving at least a portion of a thermionic electron cathode. In other embodiment, different machined features (e.g., slot, pocket, or protrusion) may be formed to accept different cathode shapes.

Figure 16:
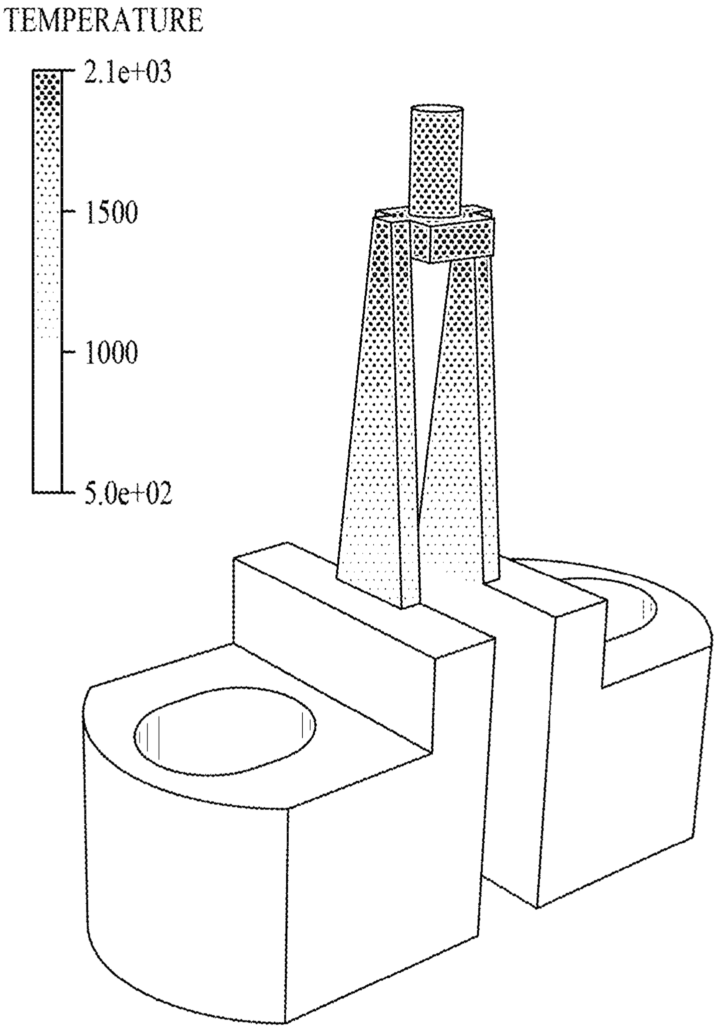
FIG. 16 is a Para View visualization image of a multiphysical software simulation showing a Joule-heating gradient model of a monolithic graphite heater according to another embodiment.

The geometry of the device that a heater goes into will dictate the shape of the heater. For instance, the previous embodiments are suitable as a MVM substitute, so the embodiments may fit into that same form factor, power supply, electronic specifications. FIG. 16-FIG. 21 show several variants of monolithic graphite heater that also localize heat, but have different shapes tailored for different use cases. For example, FIG. 16 shows an elongate version.

Figure 17:
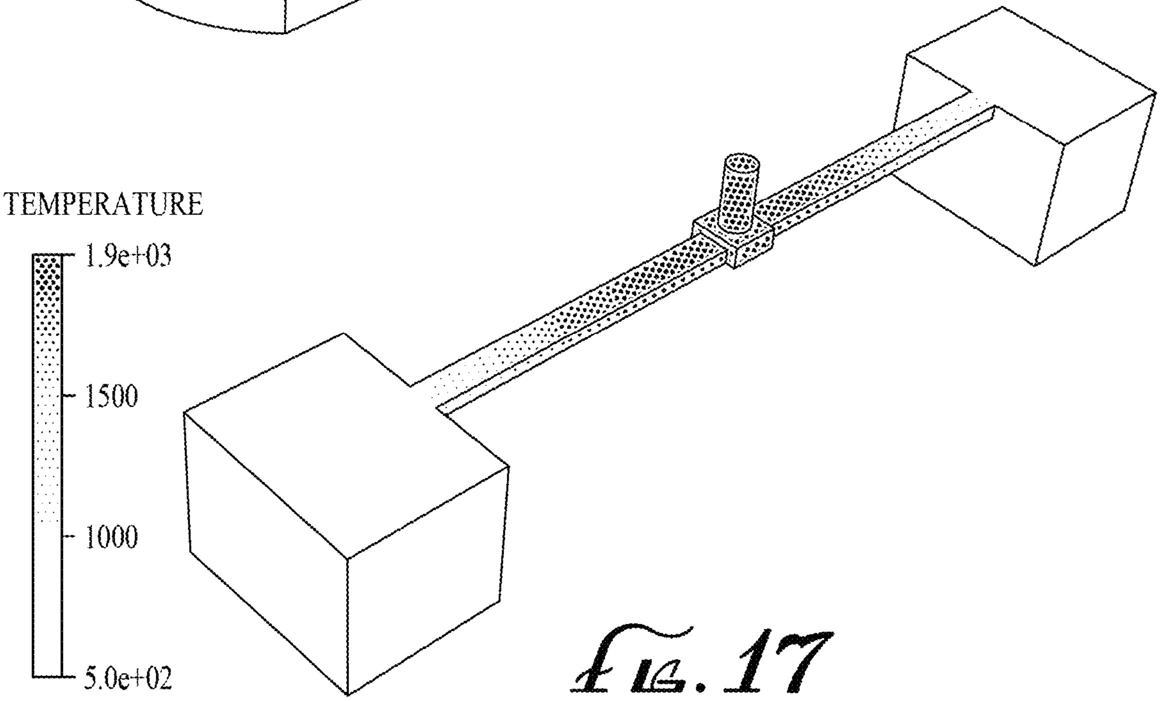
FIG. 17 is a Para View visualization image of a multiphysical software simulation showing a Joule-heating gradient model of a monolithic graphite heater according to another embodiment.

FIG. 17 shows a low-height version, in which the apex is the midpoint traveling from the first electrode to the second electrode along the structure. Compared to the versions shown in FIG. 8 and FIG. 9, the version is FIG. 17 has a difference in the size of the crystal mount and the size of the crystal (thermal mass), which results in a thermal apex toward the middle.

Figure 18:
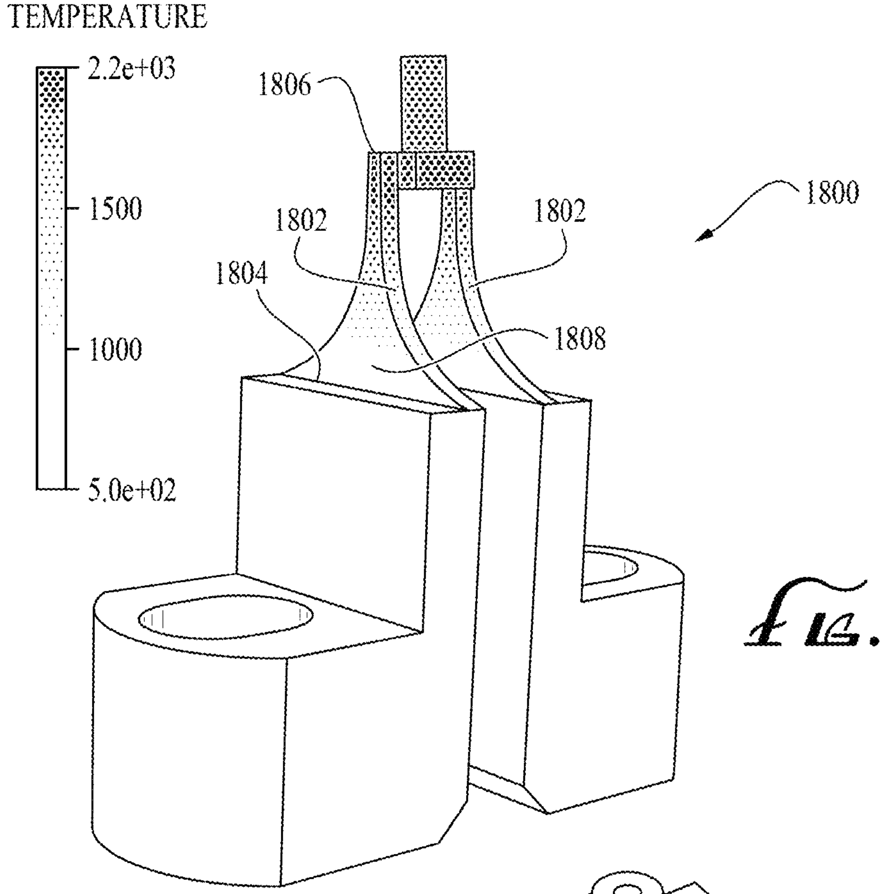
FIG. 18 is a Para View visualization image of a multiphysical software simulation showing a Joule-heating gradient model of a monolithic graphite heater according to another embodiment.

FIG. 18 shows a higher-temperature version 1800. In this version 1800, rather than having straight sidewalls, sidewalls 1802 are concaved curved in a direction from a base 1804 to a thermal apex 1806 to form substantially concaved triangular faces 1808. These faces 1808 have less surface area compared to straight triangular faces, which effectively increases the maximum Joule-heating.

Figure 19:
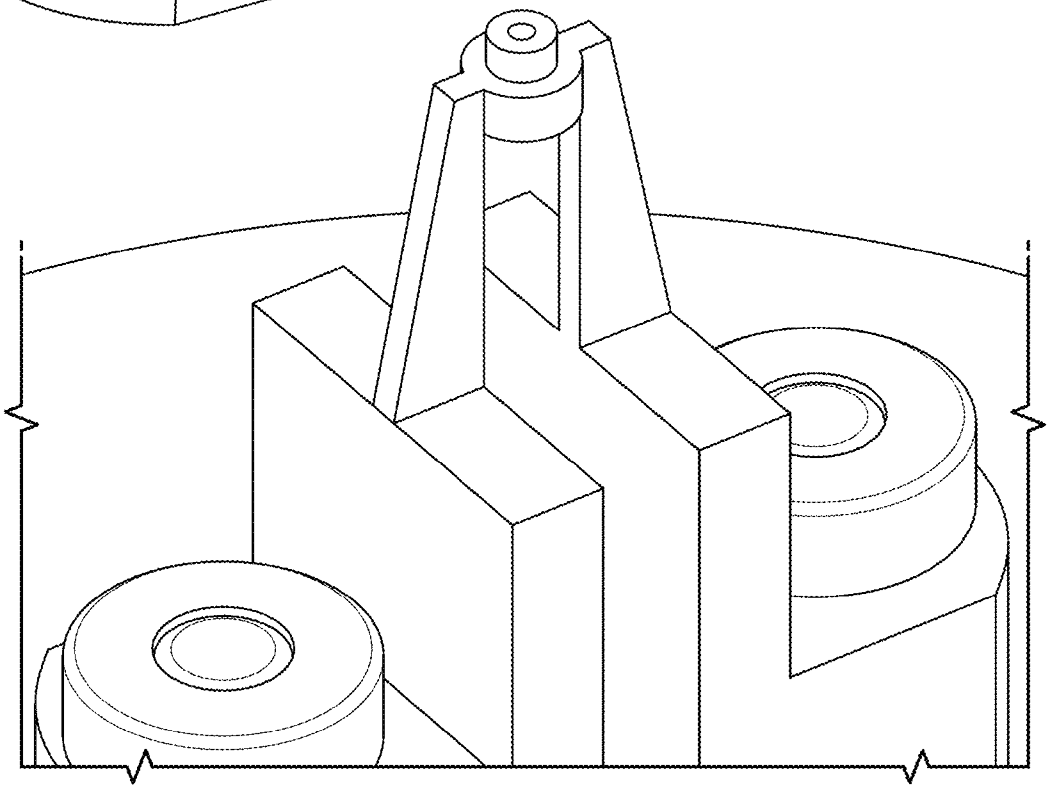
FIG. 19 is a Para View visualization image of a multiphysical software simulation showing a Joule-heating gradient model of a monolithic graphite heater according to another embodiment.

FIG. 19 shows another variant in which triangular arms are oriented so that the major faces do not confront each other.

Figure 20:
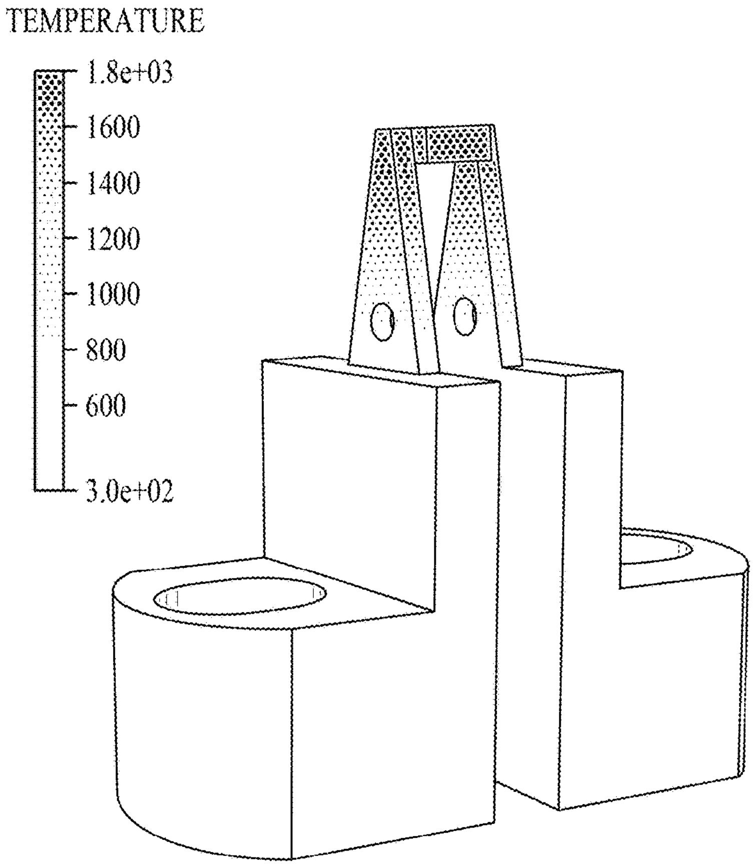
FIG. 20 is a ParaView visualization image of a multiphysical software simulation showing a Joule-heating gradient model of a monolithic graphite heater according to another embodiment.

FIG. 20 shows another variant in which each arm includes an aperture. This reduces heating loss in the legs, thereby improving efficiency without unduly compromising mechanical stability.

Figure 21:
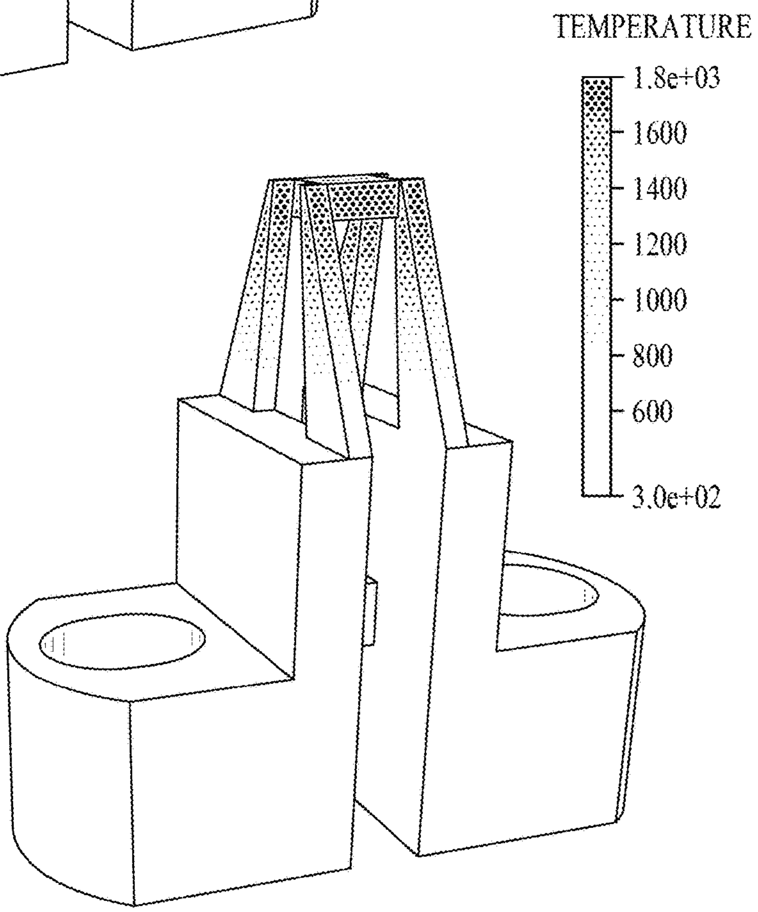
FIG. 21 is a Para View visualization image of a multiphysical software simulation showing a Joule-heating gradient model of a monolithic graphite heater according to another embodiment.

FIG. 21 shows another variant in which the aperture extends from the base to the thermal apex, thereby bifurcating each leg.

Skilled persons will appreciate that many changes may be made to the details of the above-described embodiments without departing from the underlying principles of the disclosure. For example, the disclosed heater could be made from materials other than graphite, including other refractory metals, borides, or carbides. Furthermore, the localization of heat can be used to heat a rod, metal wire, metal coil, or other devices besides a thermionic cathode source. The scope of the present invention should, therefore, be determined only by the following claims and equivalents.

What is claimed is:

1. A method of operating a thermionic emitter having a monolithic graphite heater designed for heating a thermionic electron cathode, comprising:

electrically coupling a pair of electrodes to a power source, in which each electrode is mated with a corresponding electrically conductive arm of the monolithic graphite heater, each electrically conductive arm having an electrode mount at a proximal end, a thermal apex at a distal end, and a transitional region between the electrode mount and the thermal apex, and in which each electrically conductive arm is structured to support a cathode mount electrically and mechanically coupling each thermal apex to form a maximum Joule-heating region at or adjacent the cathode mount and decreasing Joule heating along each transitional region; and applying an electrical current to the pair of electrodes and through the electrically conductive arms of the monolithic graphite heater for operation of the monolithic graphite heater in a vacuum environment to reach an operating temperature through localized heating at the maximum Joule-heating region and thereby facilitate thermionic emission from the thermionic electron cathode fit in the cathode mount.

2. The method of claim 1, further comprising monitoring a temperature of the thermionic electron cathode using a temperature sensing device to maintain the operating temperature within a desired range for the thermionic emission.

3. The method of claim 1, in which each transitional region includes a rectangular base, a rectangular top that is smaller than the rectangular base, a pair of opposing truncated triangular faces, and a uniform thickness between the pair of opposing truncated triangular faces.

4. The method of claim 1, in which the maximum Joule-heating region is configured to operate in a temperature range from about the operating temperature of the thermionic electron cathode to about 10 percent greater than the operating temperature.

5. The method of claim 4, in which the temperature range is from about 1,800 degrees Kelvin to about 1,980 degrees Kelvin.

6. The method of claim 1, in which the cathode mount includes a rectangular body.

7. The method of claim 1, in which the cathode mount includes a cylindrical body.

8. The method of claim 1, further comprising:

a first electrode disposed in a first aperture of the electrode mount of a first electrically conductive arm; and a second electrode disposed in a second aperture of the electrode mount of a second electrically conductive arm.

9. The method of claim 1, further comprising a ceramic base on which each electrode mount is fastened.

10. The method of claim 1, in which the electrical current is in a range from 4.21 amps to 5.11 amps.

11. The method of claim 1, in which the power source applies a voltage in a range from 2.29 volts to 2.64 volts.

* * * * *